United States Patent [19]
Chen et al.

[11] Patent Number: 5,751,471
[45] Date of Patent: May 12, 1998

[54] SWITCHABLE LENS AND METHOD OF MAKING

[75] Inventors: Diana Chen, Gilbert; Wenbin Jiang, Phoenix; Michael S. Lebby, Apache Junction, all of Ariz.

[73] Assignee: Motorola, Inc., Schaumburg, Ill.

[21] Appl. No.: 848,848

[22] Filed: May 2, 1997

[51] Int. Cl.$^6$ .......................................... G02F 1/29
[52] U.S. Cl. .................. 359/319; 359/296; 359/320; 359/279
[58] Field of Search ....................... 359/319, 320, 359/321, 322, 296, 10, 11, 279

[56] References Cited

U.S. PATENT DOCUMENTS

| | | | |
|---|---|---|---|
| 3,767,392 | 10/1973 | Ota | 359/296 |
| 3,772,013 | 11/1973 | Wells | 359/296 |
| 4,093,534 | 6/1978 | Carter et al. | 359/296 |
| 4,919,521 | 4/1990 | Tada et al. | 359/296 |
| 5,204,772 | 4/1993 | Hirata et al. | 359/296 |

*Primary Examiner*—Loha Ben
*Attorney, Agent, or Firm*—Eugene A. Parsons

[57] ABSTRACT

A switchable lens includes first and second optically transparent substrates, a first electrically conductive, optically transparent contact film positioned on a surface of the first optically transparent substrate, a second electrically conductive, optically transparent contact film positioned on a surface of the second optically transparent substrate, and phase modulating material sandwiched between the first and second electrically conductive, optically transparent contact films. The phase modulating material has a lens function stored therein which is temporarily erasable by a potential applied between the first and second electrically conductive, optically transparent contact films, the phase modulating material thereby being capable of modulating light passing therethrough.

22 Claims, 3 Drawing Sheets

SWITCHABLE LENS AND METHOD OF MAKING

FIELD OF THE INVENTION

The present invention pertains to optical components, and more specifically, to optical lens complexes.

BACKGROUND OF THE INVENTION

The rapid advancement of multimedia applications calls for a system that stores more information more compactly, is easy to use and handle, and possesses superior performance in every respect. The digital video disk (DVD) technology offers that advantage, and its application field extends from movie entertainment to computer data storage. In fact, the DVD has a tremendous role to play wherever digital technology rules—that is, everywhere big capacity is a must.

DVD is alternatively called digital versatile disk. It includes products and software that will be built in conformance with a specification being developed by a consortium of the largest computer, consumer electronics, and entertainment companies. The intention is to create a range of compatible products based on a new generation of the Compact Disk format which provides increased storage capacity and performance, especially for video and multimedia applications.

A compact disk (CD) can only store 5 minutes worth of analog image information, and a larger size laser disk of 11.8 inches can store 60 minutes of images. The movie and computer industries both want a small disc with CD compatibility, because the CD is the global standard for music and computer software and is increasingly packaged on CD ROMs. People are familiar with these convenient, space-saving disks. Also, both industries want a disk with enough single-side capacity to handle the general run of tasks. There has to be enough capacity for interruption-free movie viewing and for fast, reliable access and retrieval of computer data. The new DVD standard allows a single sided DVD to hold 4.7 gigabytes of information, enough to store 135 minutes of high quality movie. The DVD also offers great advantages to users of computers.

As the industry introduces new digital technologies, an increasingly important consideration is compatibility with previous formats. Great effort has gone into making the DVD system, such as DVD-ROM, backward compatible. That means owners will be able to play the existing CD format on a DVD system. However, there exist quite a few physical differences between a DVD system and a CD system. For instance, a DVD format disk has a pit length of 0.4 μm and a track pitch of 0.74 μm, almost half that of a CD format disk. In addition, the DVD substrate is 0.6 mm, in comparison to a CD substrate of 1.2 mm. The DVD laser wavelength is either 635 nm or 650 nm, and the DVD numerical aperture (NA) of the focal lens is 0.6, while the CD laser wavelength is 780 nm, and the CD NA of the focal lens is 0.45. These different parameters between a DVD and a CD lead to differences between a DVD pickup module and a CD pickup module.

Several approaches have been proposed to solve the DVD backward compatibility issue. Among the candidate solutions are an integrated two-lens switching system which consists of two lenses, one for CD, and the other for DVD, and a dual-focus pickup system in which a single lens is used to achieve focus for both CD and DVD. With the integrated two-lens switching system, two lenses, one for CD and the other for DVD, are switched by rotating the lenses horizontally to read signals for each disk. With the dual-focus pickup system, a single lens can achieve focus for both CD and DVD without being realigned, and can read the signals, due to the adoption of a hologram lens.

The two lens system and the hologram lens system are complicated and difficult to make. Another technique is to use an LCD shutter to alter the characteristics of the laser used in reading disks. The LCD shutter pickup is less complicated than the two-lens and hologram formats, resulting in a smaller, more reliable pickup. The pickup is built using a 635 nm red laser. The LCD shutter changes the numerical aperture of the lens, producing a narrower beam, resulting in a longer focal distance of 1.2 mm into CDs, or a wider beam, resulting in a shorter focal distance of 0.6 mm into DVDs. This allows reading the two different formats with one pickup.

Although the LCD shutter pickup is an improvement to either the two lens pickup system or the hologram lens pickup system, it is not an efficient use of the laser output power because the shutter blocks a significant amount of the laser power to narrow the beam width. Power efficiency is very important to laptop computer applications.

Thus it is highly desirable and an object of the present invention to provide a compact lens complex that has the capability to switch the focal length depending on the type of disk, either a DVD or a CD, in the pickup system.

It is another object of the present invention to provide a method to fabricate such a lens complex.

SUMMARY OF THE INVENTION

The above problems and others are at least partially solved and the above objects and others are realized in a switchable lens including a switchable including first and second optically transparent substrates, a first electrically conductive, optically transparent contact film positioned on a surface of the first optically transparent substrate and a second electrically conductive, optically transparent contact film positioned on a surface of the second optically transparent substrate, and phase modulating material sandwiched between the first and second electrically conductive, optically transparent contact films. The phase modulating material has a lens function stored therein which is temporarily erasable by a potential applied between the first and second electrically conductive, optically transparent contact films. The phase modulating material thereby is capable of modulating light passing therethrough.

The above problems and others are at least partially solved and the above objects and others are further realized in a method of fabricating a switchable lens including the steps of providing a phase modulating cell including two spaced apart substrates each having formed thereon a layer of conductive material, thereby providing for a first and second electrical contact, and having sandwiched between the first and second electrical contacts a continuous layer of phase modulating material. A drive circuit is connected between the two layers of conductive material, the drive circuit being capable of exerting a plurality of voltages across the phase modulating cell. The drive circuit is controlled to apply a first voltage to the phase modulating cell and a first area of the phase modulating material is exposed to light, thereby providing for recorded molecular orientation within the phase modulating material contained in the first area. The step of controlling the drive circuit and exposing to light is repeated in an additional plurality of areas of the phase modulating material, thereby providing for the recorded molecular orientation within each of the plurality of areas of the phase modulating cell depending upon a desired number of phase modulations.

DETAILED DESCRIPTION OF THE DRAWINGS

Optical lens complexes of the present invention are based on the use of a liquid crystal (LC) film in combination with a conventional convex lens. The LC film is sandwiched between transparent conductive indium-tin-oxide (ITO) films with a glass substrate. The LC film can be programmed to store a permanent lens function by properly aligning the LC monomers to alter the phase of the passing light. The lens function of the LC film can be temporally erased by applying a field across the film through the ITO contacts. The lens function will recover immediately after the field is withdrawn. The conventional convex lens is made of either glass or molded plastics. When such a lens complex that includes both the switchable nematic LC lens and the convex lens is incorporated into an optical pickup with a laser wavelength of 650 nm or 635 nm, the optical pickup can be used to read both CD and DVD. For instance, when a CD needs to be read, the field across the switchable LC lens is turned on, and the lens function in the LC film is erased. The numerical aperture (NA) of the lens complex in this state is determined by the convex lens. The laser beam passes straight through the LC film and is focused by the convex lens onto data grooves in the CD. When a DVD needs to be read, the field across the switchable LC lens is turned off, and the stored lens function recovers. The NA of the lens complex is increased due to the net focusing effect of both the LC lens and the convex lens. The larger NA allows the laser beam to be focused into a shorter distance and smaller spot size to read the DVD, which substrate depth is half of a CD's substrate depth.

Figure 1:
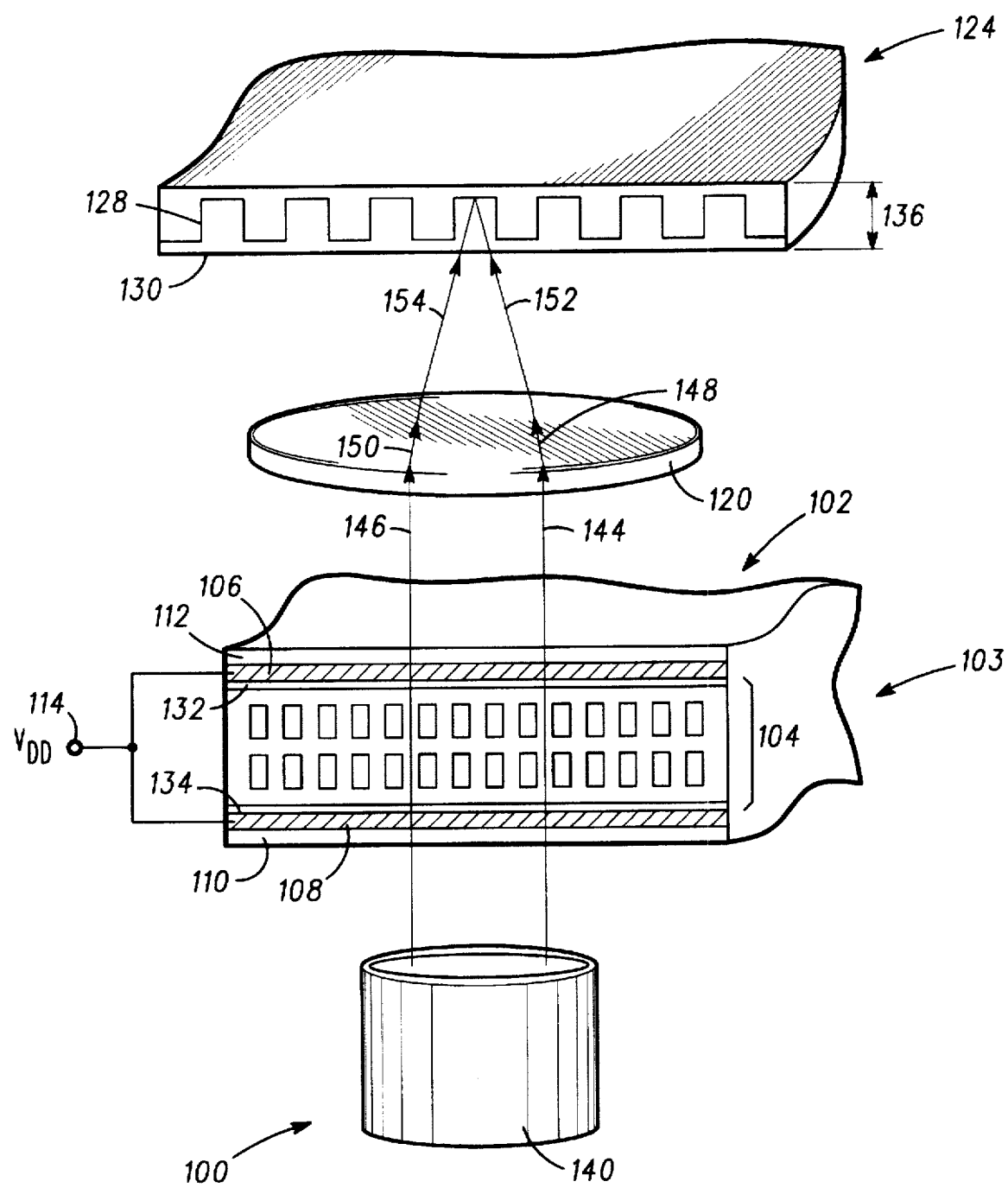
FIG. 1 is a schematic diagram of a lens complex in a state when a CD is in place.

Turning now to the drawings, attention is first directed to FIG. 1, which illustrates a schematic diagram of a laser pickup system 100, including a semiconductor laser device 140, a dual focus lens complex 102, and an optical data storage disk 124. Other related electronics parts and servo systems are not included in the drawing for the sake of simplicity. Laser device 140 is a semiconductor laser operating at either 650 nm or 635 nm, determined by the DVD standard. Lens complex 102 consists of a switchable LC lens 103, that has a lens function stored therein, and a conventional convex lens 120. LC lens 103 has a layer 104 of LC material sandwiched between two alignment layers 132 and 134 that are made of thin polymer materials. Alignment layers 132 and 134 and/or layer 104 are generally referred to collectively as phase modulating material. Alignment layers 132 and 134 are deposited on indium-tin-oxide (ITO) films 106 and 108, respectively, to facilitate the LC monomer alignment. ITO films 106 and 108 are transparent and conductive, and are deposited on carrier substrates 110 and 112, respectively, which substrates are made of glass or any other transparent substrates.

The thickness of carrier substrates 110 and 112, ITO films 106 and 108, alignment layers 132 and 134, and layer 104 of LC material is in a range of from 100 Angstroms to 1 cm, with a preferred thickness in a range from 1000 Angstroms to 100 µm, and the specific thickness of the above example in a range from 1 µm to 10 µm. Also, layer 104, referred to herein as including LC material, generally includes one of liquid crystal material, a liquid crystal, doped liquid crystal material, a nematic liquid crystal, or a smectic liquid crystal material, depending upon the application.

An electrical field provided by a voltage source 114 is applied to LC lens 103 through ITO films 106 and 108, such that the lens function stored in LC layer 104 is temporally erased or inoperative. A laser beam, which is emitted from laser device 140 and is represented by two arrows 144 and 146, is transmitted straight through LC lens 103 without any deflection. The laser beam then enters convex lens 120 and is focused onto data storage disk 124, a CD in this example. The focused beam is represented by arrows 148, 150, 152, and 154, and the cross-over point between 152 and 154 is the laser beam focal spot. Convex lens 120 is either a glass lens or molded plastic lens. The numerical aperture (NA) of convex lens 120 is between 0.35 to 0.65, and most typically between 0.45 to 0.55. Data storage disk 124 is a standard CD which consists of a substrate 126 and land and pit grooves 128 that store the data. Substrate 126 has a depth 136 that is 1.2 mm. The NA of convex lens 120 is designed to focus the laser beam from laser device 140 into substrate 126, right onto data lands and pits 128.

Figure 2:
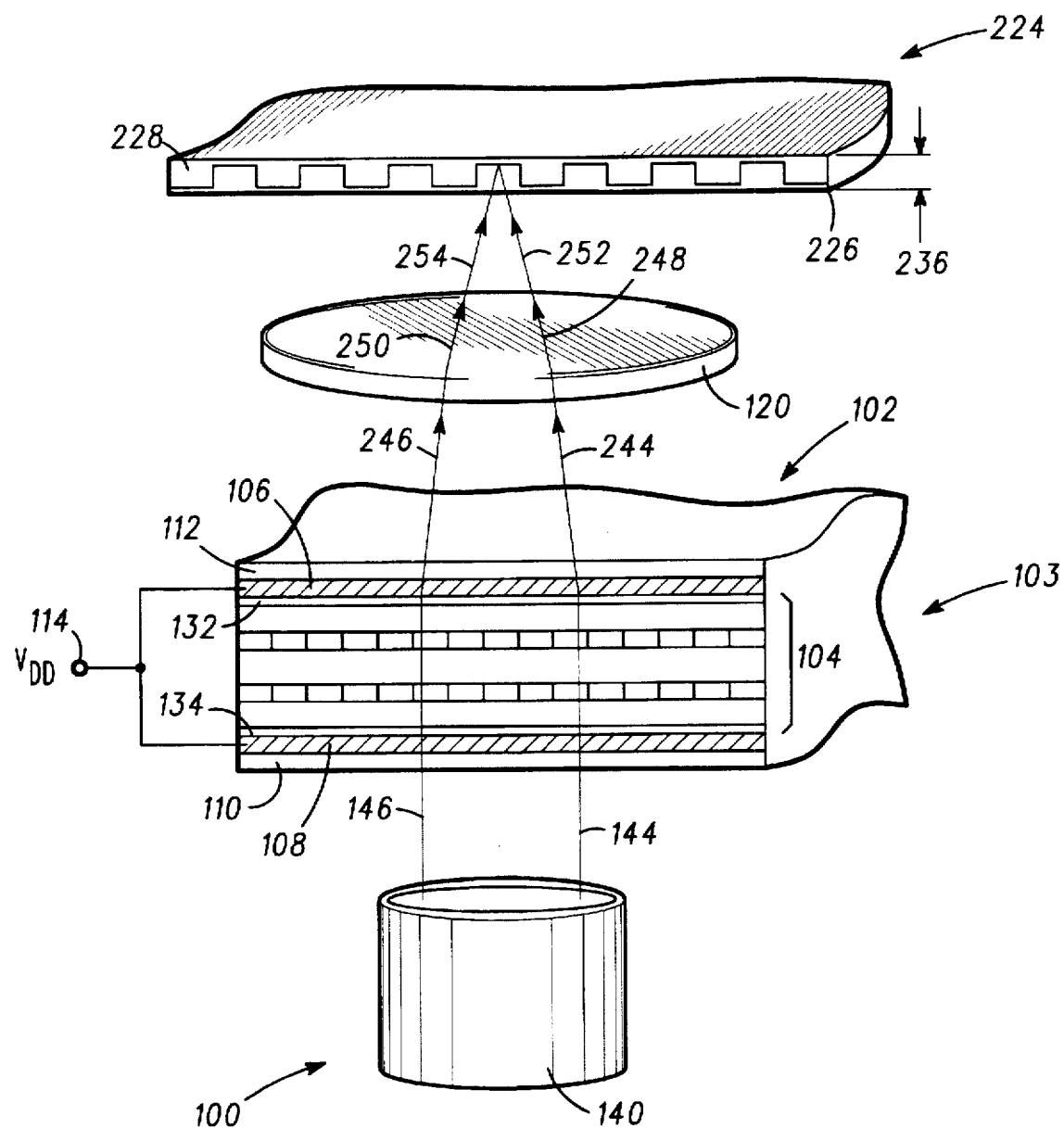
FIG. 2 is a schematic diagram of a lens complex in a state when a DVD is in place.

Turning now to FIG. 2, optical pickup system 100 is illustrated with a DVD placed in the system as an optical data storage disk. The same optical components as in FIG. 1 have the same assigned number as in FIG. 1. System 100 includes semiconductor laser device 140, dual focus lens complex 102, and an optical data storage disk 224. Other related electronics parts and servo systems are not included in the drawing for the sake of simplicity. Laser device 140 is a semiconductor laser operating at either 650 nm or 635 nm, determined by the DVD standard. Lens complex 102 consists of switchable LC lens 103 that has a lens function stored therein, and conventional convex lens 120. LC lens 103 includes layer 104 of LC material sandwiched between two alignment layers 132 and 134 that are made of thin polymer materials. The alignment layers 132 and 134 are deposited on indium-tin-oxide (ITO) films 106 and 108, respectively, to facilitate the LC monomer alignment. ITO films 106 and 108 are transparent and conductive, and are deposited on carrier substrates 110 and 112 that are made of glass or any other transparent molded plastics.

Voltage source 114 is in an open state, so no electrical field is applied to LC lens 103, and any light transmitted through LC lend 103 will be deflected. Therefore, the laser beam, which is emitted from laser device 140 and is represented by two arrows 144 and 146, is focused by LC lens 103, with the focused beam being represented by two arrows 244 and 246. The laser beam then enters convex lens 120 and is focused onto data storage disk 224, a DVD in this case. The focused beam is represented by arrows 248, 250, 252, and 254, and the cross-over point between 252 and 254 is the laser beam focal spot. Convex lens 120 is either a glass lens or molded plastic lens. The numerical aperture (NA) of convex lens 120 is between 0.35 to 0.65, and most typically between 0.45 to 0.55. The net NA of lens complex 102, that includes both switchable LC lens 103 and convex lens 120, is between 0.45 to 0.65, and most typically between 0.55 to 0.65. Data storage disk 224 is a standard DVD which consists of a substrate 226 and land and pit grooves 228 that store the data. DVD substrate 226 has a depth 236 which is 0.6 mm. The LC lens function is so designed that the net NA of lens complex 102 is sufficient to allow the laser beam from laser device 140 to be focused into the shorter DVD substrate, right onto the data lands and pits.

Figure 3:
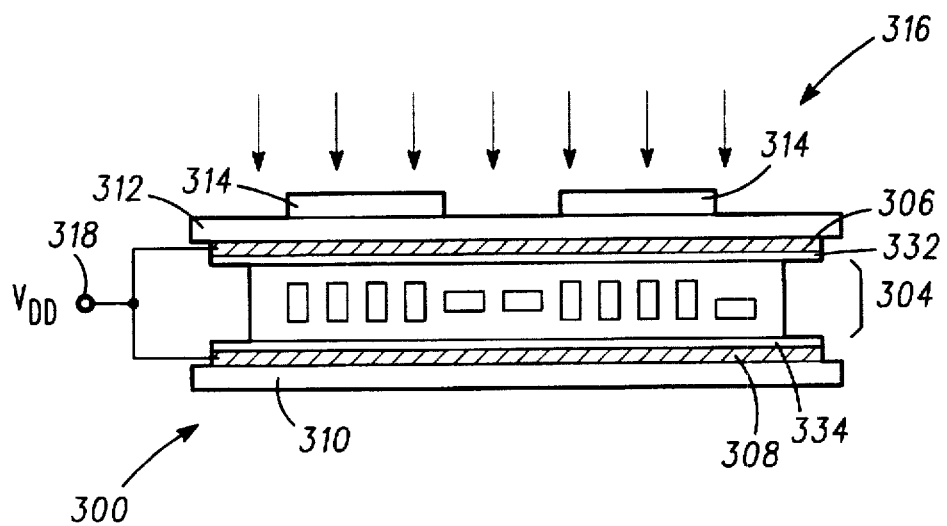
FIG. 3 is a schematic diagram illustrating the fabrication of a nematic liquid crystal lens using a photolithography method.

Turning now to FIG. 3, a first method of fabricating the switchable LC lens is illustrated schematically. FIG. 3 illustrates the fabrication of a switchable LC lens 300 by a photolithography method. A blank transparent nematic LC film 304 is sandwiched between two alignment layers 332 and 334 that are made of polymer materials to facilitate the LC monomer alignment. Alignment layers 332 and 334 are deposited on transparent conductive ITO films 306 and 308, respectively, which are deposited on carrier substrates 310 and 312. Carrier substrates 310 and 312 are made of glass or molded transparent plastics. A variable voltage source 318 is connected to blank LC film 304 through ITO contacts 306 and 308. A mask 314 is made of photoresist utilizing standard semiconductor techniques. During the lens function fabrication, a first step mask is made, and a certain magnitude field is applied to LC film 304 by setting voltage source 318 to a specific voltage. LC film 304 is then exposed to a UV light 316 to polymerize the exposed LC monomers. After the first exposure, the first mask is removed, and a second mask is deposited. Voltage source 318 is adjusted to a second setting to apply a field with the magnitude depending on the lens function to be made. The second UV exposure will polymerize a second part of the exposed LC monomers. By repeating the mask steps and the UV exposure at various electrical fields, an arbitrary shape of lens function can be written in LC film 304. After LC lens 304 is made, the lens function is temporarily erased by applying an appropriate field, and the lens function recovers when the field is removed.

Figure 4:
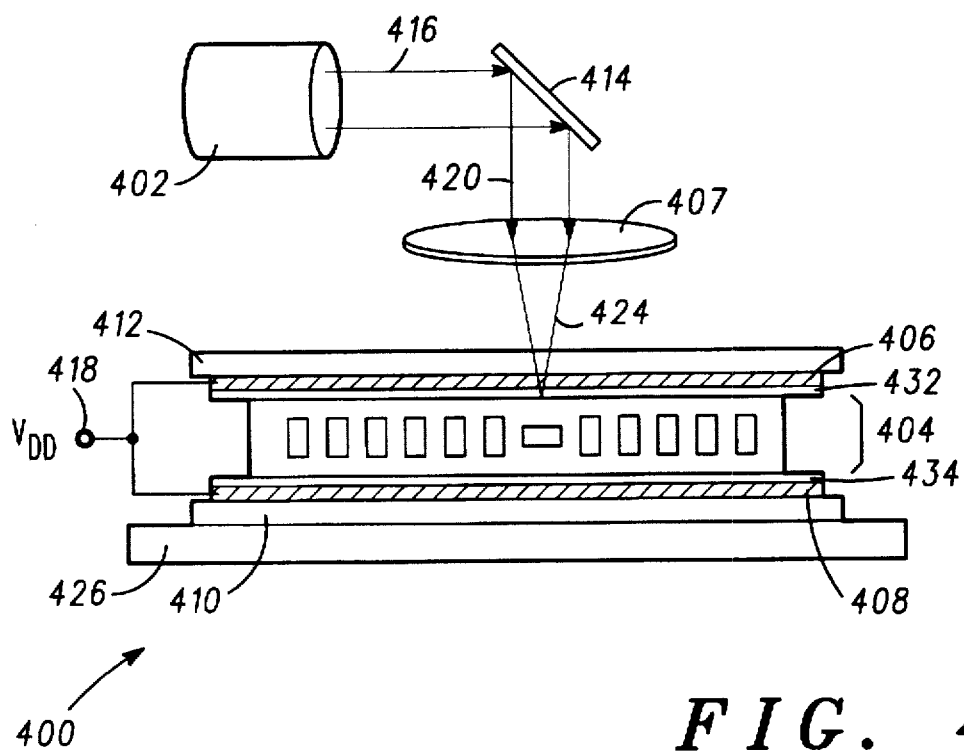
FIG. 4 is a schematic diagram illustrating the fabrication of a nematic liquid crystal lens using a laser beam writing method.

An alternative method of lens writing in the LC film is to use a laser, as illustrated schematically in FIG. 4. The fabrication of a switchable LC lens 400 starts with a blank transparent nematic LC film 404 sandwiched between two alignment layers 432 and 434 that are made of polymer materials. Alignment layers 432 and 434 are deposited on transparent conductive ITO films 406 and 408, respectively, which are deposited on carrier substrates 410 and 412. Substrates 410 and 412 are made of glass or molded transparent plastics. A variable voltage source 418 is applied to blank LC film 404 through ITO films 406 and 408. A laser 402 for the lens function writing emits a laser beam 416, which is reflected toward LC film 404 by a mirror 414. The reflected laser beam, designated 420, is focused on blank LC film 404 by a lens 407. The focused beam is represented by numeral 424. Switchable LC lens 400 is mounted on a translation stage 426. During the lens function writing, a voltage source 418 is varied according to an appropriate lens function to be written. In principle, an arbitrary lens function can be written into LC film 404. For the example disclosed here, the lens function in switchable LC film 400 simulates a convex lens, so that the net numerical aperture (NA) of the lens complex (see for example lens complex 102 in FIG. 2) is around 0.6 for reading a DVD.

Thus, a compact lens complex has been disclosed which has the capability to switch its focal length depending on the type of disk, either a DVD or a CD, that is positioned in the pickup. Further, several methods of fabricating the lens complex have been disclosed. The new and improved compact lens complex is more efficient than prior art pickups, such as the LCD shutter pickup, and is simpler to fabricate then prior art devices, such as the two lens system and the hologram lens.

While we have shown and described specific embodiments of the present invention, further modifications and improvement will occur to those skilled in the art. We desire it to be understood, therefore, that this invention is not limited to the particular forms shown and we intend in the appended claims to cover all modifications that do not depart from the spirit and scope of this invention.

What is claimed is:

1. A switchable lens comprising:

first and second optically transparent substrates;

a first electrically conductive, optically transparent contact film positioned on a surface of the first optically transparent substrate and a second electrically conductive, optically transparent contact film positioned on a surface of the second optically transparent substrate; and phase modulating material sandwiched between the first and second electrically conductive, optically transparent contact films, the phase modulating material having a lens function stored therein which is temporarily erasable by a potential applied between the first and second electrically conductive, optically transparent contact films, the phase modulating material thereby being capable of modulating light passing therethrough.

2. A switchable lens as claimed in claim 1 wherein the lens function of the phase modulating material defines a convex lens.

3. A switchable lens as claimed in claim 1 further including a driver/control circuit connected to the first and second electrically conductive, optically transparent contact films for applying a voltage across the phase modulating material, thereby changing the structure of the phase modulating material.

4. A switchable lens as claimed in claim 1 wherein the switchable lens is incorporated into an optical system, and the switchable lens provides a function of changing the focal length of the optical system.

5. A switchable lens as claimed in claim 1 wherein the phase modulating material includes at least one layer of alignment material to facilitate the alignment of the phase modulating material.

6. A switchable lens as claimed in claim 1 wherein the phase modulating material includes one of a liquid crystal material, a liquid crystal polymer, a doped liquid crystal material, a nematic liquid crystal material, and a smectic liquid crystal material.

7. A switchable lens as claimed in claim 1 wherein the switchable lens has a thickness in a range from 100 Angstroms to 1 cm.

8. A switchable lens as claimed in claim 7 wherein the switchable lens has a thickness in a range from 1000 Angstroms to 100 µm.

9. A switchable lens as claimed in claim 8 wherein the switchable lens has a thickness in a range from 1 µm to 10 µm.

10. A switchable lens as claimed in claim 1 wherein the first and second electrically conductive, optical transparent contact films include indium tin oxide.

11. A dual focus lens system comprising:

a first transparent substrate having a first surface, the first transparent substrate being made of an insulating material;

a first electrically conductive, transparent contact film disposed on the first surface of the first transparent substrate;

a layer of phase modulating material disposed on the first electrically conductive, transparent contact film, the layer of phase modulating material having a thickness and a memory of a lens pattern with a first optical axis, a first numerical aperture and a first focal length;

a second electrically conductive, transparent contact film disposed on the phase modulating material;

a second transparent substrate having a second surface disposed on the layer of phase modulating material; and an optical lens having a second optical axis, a second numerical aperture, and a second focal length, wherein the first optical axis and the second optical axis are substantially superimposed.

12. A dual focus lens system as claimed in claim 11 wherein the optical lens is made of plastic.

13. A dual focus lens system as claimed in claim 11 wherein the phase modulating material includes one of a liquid crystal material, a liquid crystal polymer, a doped liquid crystal material, a nematic liquid crystal material, and a smectic liquid crystal material.

14. A dual focus lens system as claimed in claim 11 wherein the first numerical aperture is in a range from 0.10 to 0.80.

15. A dual focus lens system as claimed in claim 14 wherein the first numerical aperture is in a range from 0.35 to 0.65.

16. A dual focus lens system as claimed in claim 15 wherein the first numerical aperture is in a range from 0.45 to 0.60.

17. A dual focus lens system as claimed in claim 11 wherein a focused spot size of the lens system is in a range from 0.4 micrometer to 1.0 millimeter.

18. A method of fabricating a switchable lens comprising the steps of:

providing a phase modulating cell including two substrates each having formed thereon a layer of conductive material, thereby providing for a first and second electrical contact and having sandwiched between the first and second electrical contacts a continuous layer of phase modulating material;

connecting a drive circuit between the two layers of conductive material, the drive circuit being capable of exerting a plurality of voltages across the phase modulating cell;

controlling the drive circuit to apply a first voltage to the phase modulating cell and exposing a first area of the phase modulating material to light, thereby providing for recorded molecular orientation within the phase modulating material contained in the first area; and repeating the step of controlling the drive circuit and exposing to the light an additional plurality of areas of the phase modulating material, thereby providing for the recorded molecular orientation within each of the plurality of areas of the phase modulating material depending upon a desired number of phase modulations.

19. A method of fabricating a switchable lens as claimed in claim 18 wherein the phase modulating material includes one of a liquid crystal material, a doped liquid crystal material, liquid crystal polymers, a nematic liquid crystal material, and a smectic liquid crystal material.

20. A method of fabricating a switchable lens as claimed in claim 18 wherein the steps of exposing the first area and the additional plurality of areas of the phase modulating material to light includes exposing to ultraviolet light.

21. A method of fabricating a switchable lens comprising the steps of:

providing a phase modulating cell composed of two substrates each having formed thereon a layer of conductive material, thereby providing for a first and second electrical contact and having positioned between the layers of conductive material a continuous layer of phase modulating material;

connecting a drive circuit capable of exerting a plurality of voltages across the first and second electrical contacts of the phase modulating cell;

exposing a first area of the phase modulating cell to a first voltage and a laser emission thereby providing for the recorded molecular orientation within the phase modulating material contained in the first area; and repetitively exposing to other voltages and the laser emission an additional plurality of areas of the phase modulating cell, thereby providing for recorded molecular orientation within each of the additional plurality of areas of the phase modulating cell dependent upon a desired number of phase modulations.

22. A method of fabricating a switchable lens as claimed in claim 21 wherein the phase modulating material includes one of a liquid crystal material, a doped liquid crystal material, liquid crystal polymers, a nematic liquid crystal material, and a smectic liquid crystal material.

* * * * *